Patented Apr. 29, 1941

2,240,025

UNITED STATES PATENT OFFICE 2,240,025

MERCURATED HALOGENATED PHENYL PHENOL

Howard Worne and John Stanton Pierce, Georgetown, Ky., assignors, by direct and mesne assignments, to Samuel Brass, New York, N. Y.

No Drawing. Application April 24, 1937,
Serial No. 138,750

11 Claims. (Cl. 260—433)

This invention relates to a new class of derivatives of ortho-phenylphenol. More particularly, the invention relates to mercurated derivatives of halogenated ortho-phenylphenols and has for its principal objects the provision of such compounds. The invention is especially concerned with mercurated derivatives of mono- and dihalogenated, particularly monohalogenated, ortho-phenylphenols.

It has been found that mercurated derivatives of mono- and dihalogenated substituted ortho-phenylphenols may be prepared by reacting certain organic mercury compounds with halogenated phenylphenols. For example, mercuric acetate may be made to react with a halogenated ortho-phenylphenol under the influence of heat to form a product from which a crystalline mercurated derivative of the halogenated ortho-phenylphenol may be recovered by suitable treatment. Certain mercurated derivatives, for example, the hydroxymercuri derivatives, of halogenated ortho-phenylphenols prepared in accordance with the invention may be heated with the resulting formation of corresponding anhydro products, for example, anhydrohydroxymercuri derivatives of halogenated ortho-phenylphenols.

As illustrative of the manner in which the mercurated derivatives of the invention have been prepared, the following description of the preparation of anhydrohydroxymercuri 4-chloro-ortho-phenylphenol is given. Twenty and a half parts of 4-chloro-ortho-phenylphenol (which may be prepared in any known manner) and 15.9 parts of mercuric acetate (corresponding to the molar proportions of two to one) are placed in a suitable container together with 80 parts of 95% ethyl alcohol, 10 parts of water and 10 parts of glacial acetic acid and the container is sealed. The contents in the sealed container are then heated at approximately 140° C. for about two hours, and under the influence of the heat and developed pressure the mercuric acetate and the chloro-ortho-phenylphenol react.

It is not always necessary to employ such high temperatures to cause the reaction to occur. For example, 4-chloro-o-phenylphenol has been caused to react with mercuric acetate by heating these reagents in a suitable solvent at atmospheric pressure and a temperature as low as 78° C. Higher temperatures are advantageous, however, because the reaction proceeds more speedily when higher temperatures are employed.

At the end of the heating period, the container is opened and the contents are emptied into 600 parts of water. After a few moments an oily layer separates from the water. The aqueous component is decanted from the oily product and is discarded, and the oily product is treated to recover the mercurated derivative in purified form.

The oily product is extracted with 100 parts of warm alcohol and the resulting solution is filtered. The separated residue contains the bulk of the mercurated derivative, but some of it passes into solution in the alcohol and to recover it about 30 parts of water is added to the filtrate. A precipitate of the mercurated derivative thus is formed and is suitably separated (by filtration, decantation, or otherwise) from the supernatant liquid. This precipitate is combined with the main residue insoluble in alcohol, and the combined solids are extracted with about 200 parts of hot 4% sodium hydroxide solution. The resulting solution is filtered hot and the alkaline filtrate is brought to a pH of about 8 by the gradual addition of acetic acid. The filtrate preferably is vigorously stirred during the addition of the acid. The mercurated derivative precipitates during this operation, and the precipitate, after separation from the aqueous solution, is extracted with 100 parts of alcohol. The solid residue resulting after this extraction is air dried to secure a mercurated product which may be employed without further treatment for germicidal and fungicidal purposes.

The air dried product is heated for several hours at a temperature of about 110° C. to obtain the final product, anhydrohydroxymercuri 4-chloro-ortho-phenylphenol, which melts, with some decomposition, at 229–231° C. A good yield is obtained.

Other mercurated derivatives of mono- and dihalogenated substituted ortho-phenylphenols may be produced in substantially the same manner as described above by simply changing the substituted ortho-phenylphenol reagent used as a starting material. For example, hydroxymercuri derivatives of 2-chloro-ortho-phenylphenol, of 4-bromo-ortho-phenylphenol, of 4-iodo-ortho-phenylphenol, of 2,4 dibromo-ortho-phenylphenol, and of other halogenated ortho-phenylphenols are prepared by employing mercuric acetate and the proper halogenated ortho-phenylphenol as a starting material. The monohalogenated of these compounds may be represented generally by the formula

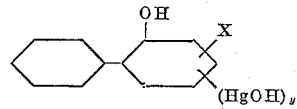

where X represents the halogen atom and $y$ represents the number of hydroxymercuri substituents.

By varying the proportions of mercuric acetate and substituted o-phenylphenol, and the temperature at which these substances are caused to react, it is possible to vary the mercury content of the product within wide limits. Thus, by increasing the proportion of mercuric acetate and by increasing the temperature at which the reaction is carried out, a mercurated product containing an increased percentage of mercury may be produced. In general, mercuration products in which from one to three mercury atoms are substituted on the phenol ring may be prepared by this procedure.

Mercurated derivatives of monohalogenated (and dihalogenated) substituted ortho-phenylphenols are particularly satisfactory antiseptic, germicidal and fungicidal agents. The toxicity of these compounds to animal tissue is very low, so that they may be applied to injured surfaces without danger. Pharmocological tests indicate that repeated applications of solutions of the compounds to abraded skin areas cause no local irritation. Solutions of these compounds having a high phenol coefficient may easily be prepared. Solutions of the compounds also possess other attributes of good antiseptic preparations such as low surface tension, high diffusibility, high fat-penetrating powers, slight odor and stability. The mercurated derivatives of the invention are therefore well adapted for use in the manufacture of various antiseptic preparations.

We claim:

1. As a new product, a mercurated halogenated ortho-phenylphenol in which mercury and a halogen are substituted on the phenol ring.

2. As a new product, a hydroxymercuri halogenated ortho-phenylphenol in which mercury and a halogen are substituted on the phenol ring.

3. As a new product, a mercurated monohalogenated ortho-phenylphenol in which mercury and a halogen are substituted on the phenol ring.

4. As a new product, a mercurated dihalogenated ortho-phenylphenol in which mercury and a halogen are substituted on the phenol ring.

5. As a new product, a hydroxymercuri monohalogenated ortho-phenylphenol in which mercury and a halogen are substituted on the phenol ring.

6. As a new product, a hydroxymercuri dihalogenated ortho-phenylphenol in which mercury and a halogen are substituted on the phenol ring.

7. As a new product, a mercurated 4-chloro-o-phenylphenol in which mercury is substituted on the phenol ring.

8. As a new product, hydroxymercuri-4-chloro-o-phenylphenol.

9. As a new product, a compound having the formula

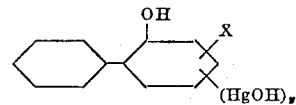

where X is a halogen and $y$ is an integer from one to three.

10. As a new product, a hydroxymercuri-2-chloro-ortho-phenylphenol.

11. A mercurated halogenated compound from the class consisting of hydroxymercuri orthophenylphenol and anhydrohydroxymercuri ortho-phenylphenol in which mercury and a halogen are substituted on the phenol ring.

HOWARD WORNE.
JOHN STANTON PIERCE.